United States Patent
Borsand et al.

(10) Patent No.: US 8,751,358 B2
(45) Date of Patent: Jun. 10, 2014

(54) SYSTEM AND METHOD FOR AUTOMATED ORDER ENTRY ON SHORT QUEUES

(75) Inventors: Steven F. Borsand, Deerfield, IL (US); Michael J. Burns, Chicago, IL (US); Scott F. Singer, Lake Bluff, IL (US)

(73) Assignee: Trading Technologies International, Inc, Chicago, IL (US)

( * ) Notice: Subject to any disclaimer, the term of this patent is extended or adjusted under 35 U.S.C. 154(b) by 94 days.

(21) Appl. No.: 13/431,663

(22) Filed: Mar. 27, 2012

(65) Prior Publication Data

US 2012/0185376 A1   Jul. 19, 2012

Related U.S. Application Data

(63) Continuation of application No. 12/338,824, filed on Dec. 18, 2008, which is a continuation of application No. 11/415,873, filed on May 2, 2006, now Pat. No. 7,483,855, which is a continuation of application No. 10/284,882, filed on Oct. 31, 2002, now Pat. No. 7,426,490.

(51) Int. Cl.
*G06Q 40/06* (2012.01)
*G06Q 40/04* (2012.01)

(52) U.S. Cl.
USPC .............................. 705/36 R; 705/35; 705/37

(58) Field of Classification Search
CPC ...................................... G06Q 40/04
USPC ........................................... 705/35, 37, 36 R
See application file for complete search history.

(56) References Cited

U.S. PATENT DOCUMENTS

| | | | |
|---|---|---|---|
| 4,674,044 A | 6/1987 | Kalmus et al. | |
| 5,101,353 A | 3/1992 | Lupien et al. | |
| 5,787,402 A | 7/1998 | Potter et al. | |
| 5,819,238 A | 10/1998 | Fernholz | |
| 5,926,801 A | 7/1999 | Matsubara et al. | |
| 6,134,535 A | 10/2000 | Belzberg | |
| 6,282,521 B1 | 8/2001 | Howorka | |
| 6,418,419 B1 | 7/2002 | Nieboer et al. | |
| 6,766,304 B2 * | 7/2004 | Kemp et al. ................. | 705/36 R |
| 6,772,132 B1 | 8/2004 | Kemp, II et al. | |
| 6,938,011 B1 | 8/2005 | Kemp, II et al. | |
| 6,983,260 B2 | 1/2006 | Hummelgren | |
| 7,043,449 B1 * | 5/2006 | Li et al. ....................... | 705/36 R |

(Continued)

FOREIGN PATENT DOCUMENTS

| | | |
|---|---|---|
| EP | 1067471 A1 | 1/2001 |
| EP | 1104904 A1 | 6/2001 |

(Continued)

*Primary Examiner* — Jagdish Patel
(74) *Attorney, Agent, or Firm* — McDonnell Boehnen Hulbert & Berghoff LLP

(57) ABSTRACT

Orders are automatically sent to the market when certain user defined conditions are met. In particular, a trader can configure the trading application to automatically send orders for preset quantities at price levels with queues falling below a user defined threshold. The length of queues may be measured in several ways, for example, the queue length could be measured by quantity at a given price level or the queue length could be measured by the number of orders at a given price level, or the queue length could be measured by a combination of quantity and orders. The present embodiments can more quickly recognize opportunities and send an order to take advantage of it than a trader can do manually. Other advantages and features are described herein.

21 Claims, 5 Drawing Sheets

(56) References Cited

U.S. PATENT DOCUMENTS

| | | |
|---|---|---|
| 7,127,424 B2 | 10/2006 | Kemp, II et al. |
| 7,305,361 B2 | 12/2007 | Otero et al. |
| 7,389,268 B1 | 6/2008 | Kemp, II et al. |
| 7,426,490 B1 | 9/2008 | Borsand et al. |
| 7,428,506 B2 | 9/2008 | Waelbroeck et al. |
| 7,437,325 B2 | 10/2008 | Kemp, II et al. |
| 7,483,855 B1 | 1/2009 | Borsand et al. |
| 7,496,535 B2 | 2/2009 | Otero et al. |
| 7,827,087 B2 | 11/2010 | Adatia |
| 2002/0046146 A1 | 4/2002 | Otero et al. |
| 2002/0046149 A1 | 4/2002 | Otero et al. |
| 2002/0046151 A1 | 4/2002 | Otero et al. |
| 2002/0046156 A1 | 4/2002 | Horn et al. |
| 2002/0049661 A1 | 4/2002 | Otero et al. |
| 2002/0052827 A1 | 5/2002 | Waelbroeck et al. |
| 2002/0128950 A1 | 9/2002 | Wu et al. |
| 2002/0138401 A1 | 9/2002 | Allen et al. |
| 2002/0156716 A1 | 10/2002 | Adatia |
| 2003/0033235 A1 | 2/2003 | Hummelgren |
| 2003/0200167 A1 | 10/2003 | Kemp et al. |
| 2004/0002913 A1 | 1/2004 | Breen et al. |

FOREIGN PATENT DOCUMENTS

| | | |
|---|---|---|
| EP | 1217564 A2 | 6/2002 |
| EP | 1217564 A3 | 7/2002 |
| EP | 1246111 A2 | 10/2002 |
| WO | 9114231 A1 | 9/1991 |
| WO | 9849639 A1 | 11/1998 |
| WO | 9919821 A1 | 4/1999 |
| WO | 9930259 A1 | 6/1999 |
| WO | 0048113 A1 | 8/2000 |
| WO | 0051043 A1 | 8/2000 |
| WO | 0052619 A1 | 9/2000 |
| WO | 0062187 A2 | 10/2000 |
| WO | 0062187 A3 | 10/2000 |
| WO | 0065510 A1 | 11/2000 |
| WO | 0116830 A1 | 3/2001 |
| WO | 0116852 A2 | 3/2001 |
| WO | 0122266 A2 | 3/2001 |
| WO | 0122315 A2 | 3/2001 |
| WO | 0122315 A3 | 3/2001 |
| WO | 0188808 A1 | 11/2001 |
| WO | 0233621 A1 | 4/2002 |
| WO | 0233623 A1 | 4/2002 |
| WO | 0233635 A1 | 4/2002 |
| WO | 0233636 A1 | 4/2002 |
| WO | 0233637 A1 | 4/2002 |
| WO | 0116852 A8 | 6/2002 |
| WO | 0247006 A1 | 6/2002 |
| WO | 02080433 A2 | 10/2002 |
| WO | 03077061 A2 | 9/2003 |
| WO | 03077061 A3 | 9/2003 |
| WO | 04001653 A1 | 12/2003 |

\* cited by examiner

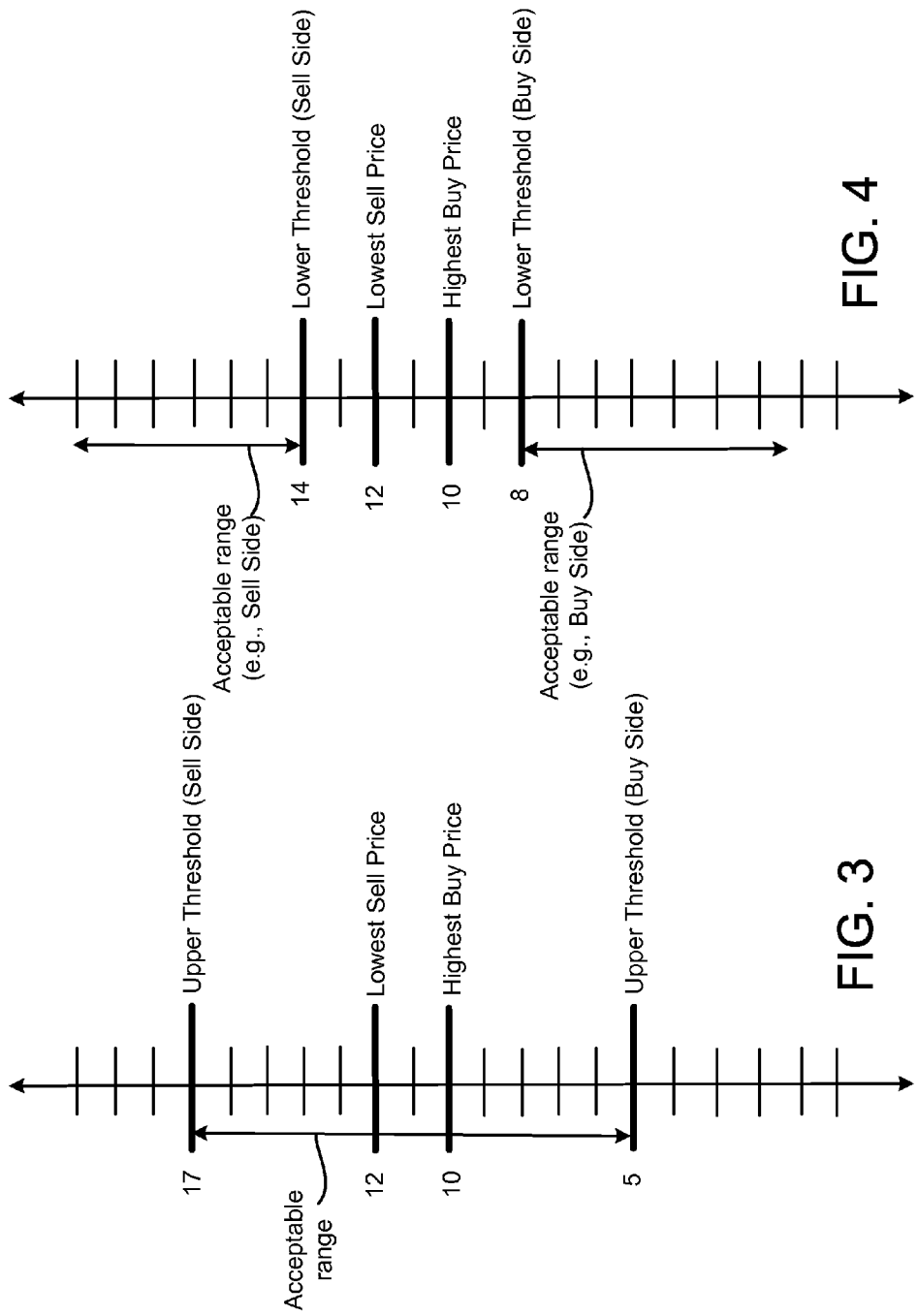

SYSTEM AND METHOD FOR AUTOMATED ORDER ENTRY ON SHORT QUEUES

CROSS REFERENCE TO RELATED APPLICATIONS

The application is a continuation of U.S. patent application Ser. No. 12/338,824, filed Dec. 18, 2008, now U.S. Pat. No. 8,170,950, which claims priority to U.S. patent application Ser. No. 11/415,873, filed May 2, 2006, now U.S. Pat. No. 7,483,855, which claims priority to U.S. patent application Ser. No. 10/284,882, filed Oct. 31, 2002, now U.S. Pat. No. 7,426,490, entitled "A System and Method for Automated Order Entry on Short Queues," all of which are incorporated in their entirety by reference herein.

FIELD OF INVENTION

The present invention is generally directed to automatic entry of electronic transactions in an electronic trading environment, and in particular, for automatically sending transaction messages to market when certain user defined conditions are met.

BACKGROUND

Trading methods have evolved from a manually intensive process to a technology enabled, electronic platform. Advances in technology are having an increasingly large and broad impact on trading and the way in which exchanges conduct business. What was previously seen as just a supplement to the traditional pit trading, electronic trading platforms continue to increase in importance and popularity. The advent of electronic trading has meant that a customer can be in virtually direct contact with the market, from practically anywhere in the world, performing near real-time transactions, and without the need to make personal contact with a broker. Electronic trading systems are also convenient for brokers on the floor at an exchange for receiving orders electronically.

Exchanges that support electronic trading are generally based on a host, one or more computer networks, and clients. In general, the host includes one or more centralized computers to form the electronic heart. Its operations typically include order matching, maintaining order books and positions, price information, and managing and updating a database that records such information. The host is also equipped with an external interface that maintains uninterrupted contact to the clients and possibly other trading-related systems.

Typically, market participants link to the host through one or more networks. A network is a group of two or more computers linked together. There are many types of networks such as local area networks and wide area networks. Networks can also be characterized by topology, protocol, and architecture. However, any type of network configuration can be used in electronic trading. For example, some market participants may link to the host through a direct connection such as a T1 or ISDN. Some participants may link to the exchange through direct connections and through other common network components such as high-speed servers, routers, and gateways. The Internet, a well known collection of networks and gateways, can be used to establish a connection between the client and the host. There are many different types of networks, and combinations of network types, known in the art that can link market participants to the host.

Regardless of the way in which a connection is established, software running on the clients allows people to log onto one or more exchanges and participate in at least one market. A client is a computer such as a personal computer, laptop computer, hand-held computer, and so forth that has network access. In general, clients run software that creates specialized interactive trading screens. Trading screens enable market participants to enter orders into the market, obtain market quotes, and monitor positions.

Generally, when an order is submitted to an exchange (e.g., via a client), the exchange checks the limits of the order, for example price, quantity, and so forth, and prioritizes the order with other orders of the same price. Exchanges often prioritize the orders based on when they were received at the exchange or through some other time stamping mechanism. Based on their priority, orders are typically arranged in a queue. Orders in the queue with the higher priority are matched first. Once the orders are matched, they are removed from the queue. This type of matching algorithm is commonly referred to as FIFO (first-in, first-out), as the first orders into the queue are typically the first orders to be matched. Sometimes, when there is a price movement in the market, orders behind in the queue might never get matched. Therefore, it is often advantageous to have orders first or near first in the queue so that they have a better chance of being matched.

The quantity of orders pending in the market (e.g., orders in the queue) at various price levels is represented by market information. Many electronic exchanges offer market information, which includes the inside market and market depth, in their data feeds which are published to client devices and displayed on the trading screen. As used herein, the inside market is the lowest sell price (best ask) and the highest buy price (best bid) at a particular point in time. Market depth refers to quantity available at the inside market and can also refer to quantity available at other prices away from the inside market. Exchanges can offer other types of market information such as the last traded price (LTP), the last traded quantity (LTQ), and/or order fill information. Market information, is often used by market participants to make better decisions about their trades.

To profit in electronic markets, however, market participants must be able to assimilate large amounts of data, including market information, and react accordingly more quickly than other competing market participants. It is therefore desirable to offer tools that can assist a market participant in adapting his or her strategy to an electronic marketplace, and help the participant to make desirable trades.

BRIEF DESCRIPTION OF THE DRAWINGS

FIGS. 3-5 are diagrams that illustrate an example use of upper and lower limits in accordance with the preferred embodiment.

DETAILED DESCRIPTION OF A PREFERRED EMBODIMENT

A system and method are described for automatically entering orders in an automated trading environment when certain user defined conditions are met. In a preferred embodiment, the system can more quickly recognize an opportunity in a market and send an order, or some other transaction message, to take advantage of it. The system recognizes opportunities and reacts accordingly, much faster than a trader can do by manually viewing the opportunity and then humanly reacting to the opportunity by clicking a mouse or keyboard, for instance, to enter an order or other transaction. The preferred embodiment is particularly useful when an opportunity exists such that there is little or no quantity, or little or no orders, at a particular price level near the inside market. Given the advantages to having an order first, or close to first, in the queue near the inside market, such an opportunity may not last long as traders will see it and react quickly to enter orders at that price level. Preferably, using the system described herein, an order can be automatically sent to the market to take advantage of the opportunity before other traders can.

In the following description, for purposes of explanation, many details are set forth to provide a thorough understanding of the preferred embodiment. It will be readily apparent, however, to one skilled in the art that the present invention may be practiced without the details described herein, unless otherwise noted. Sometimes, well-known structures and devices, such as an electronic exchange and a computer, are shown in block diagram form to avoid unnecessarily obscuring the preferred embodiment.

Hardware Overview

Figure 1:
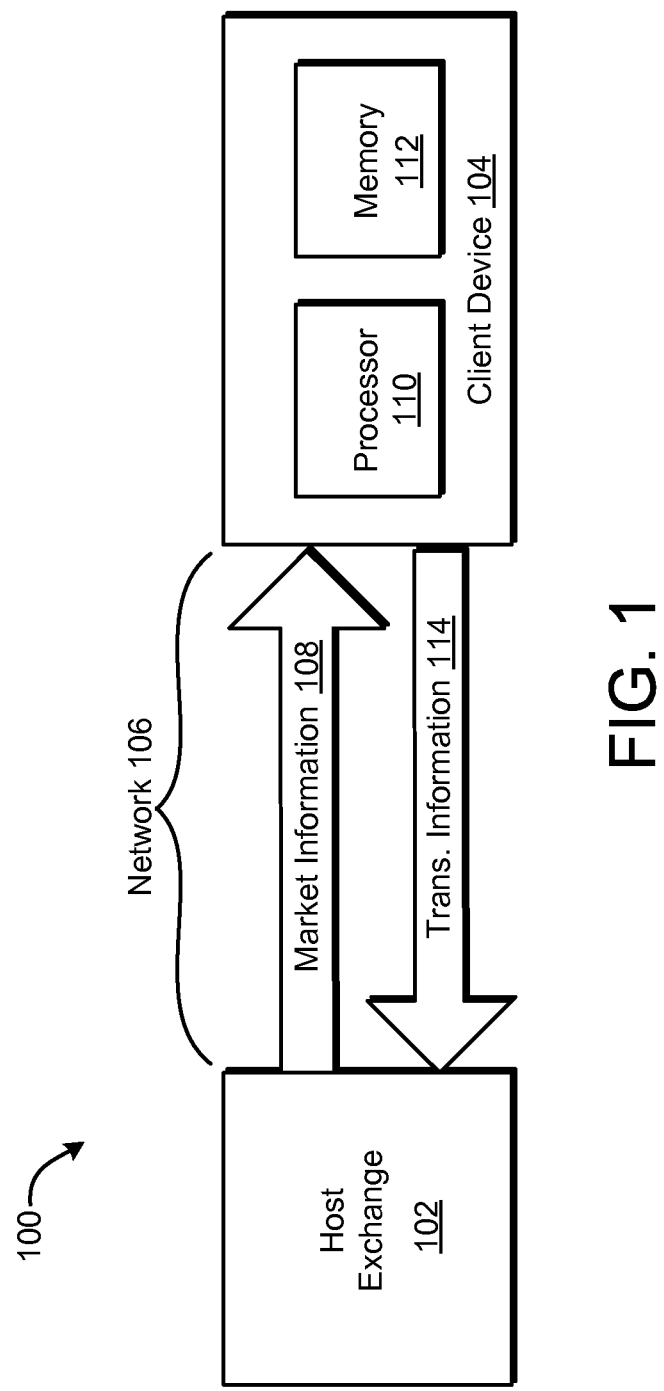
FIG. 1 is a block diagram, in general, of an example hardware system that can be used to implement the preferred embodiment.

FIG. 1 is a block diagram that illustrates an electronic trading system 100 in accordance with a preferred embodiment. System 100 may include at least one host exchange 102 and two or more client devices, only one of which is shown in the Figure as client device 104. Intermediate devices such as gateways, routers, and other such types of network devices may be used to assist client device 104 and host exchange 102 in communicating over network 106. Intermediate devices are not shown in the Figure for sake of clarity.

Host exchange 102 may include electronic exchanges like those offered by the Chicago Board of Trade ("CBOT®"), the New York Stock Exchange ("NYSE"), the Chicago Mercantile Exchange ("CME®"), the Xetra® (a German stock exchange), or the European derivatives market ("Eurex"). Host exchange 102 might also refer to other systems, from basic to more complex systems, that match incoming orders. These example host exchanges and other host exchanges are well-known in the art. Communication protocols required for connectivity to one of these host exchanges are also well-known in the art.

Preferably, each host exchange provides similar types of information to subscribing traders regarding the types of tradeable objects that they list. For sake of simplicity, the information which is provided by various host exchanges is referred to as market information 108. Market information 108 may include data that represents just the inside market, where the inside market is the lowest sell price (best ask) and the highest buy price (best bid) at a particular point in time. Market information 108 may also include market depth, where market depth refers to quantity available at the inside market and can also refer to quantity available at other prices away from the inside market. Market information 108 can contain other types of market information such as the last traded price (LTP), the last traded quantity (LTQ), and/or order fill information. As used herein, that the term "tradeable objects," refers simply to anything that can be traded with a quantity and/or price. It includes, but is not limited to, all types of tradeable objects such as financial products, which can include, for example, stocks, options, bonds, futures, currency, and warrants, as well as funds, derivatives and collections of the foregoing, and all types of commodities, such as grains, energy, and metals. The tradeable object may be "real", such as products that are listed by an exchange for trading, or "synthetic", such as a combination of real products that is created by the user. A tradeable object could actually be a combination of other tradeable object, such as a class of tradeable objects.

Client device 104 is a computer that provides an interface to trade at host exchange 102. Example client devices might include a personal computer, laptop computer, hand-held computer, and so forth. Client device 104, according to the preferred embodiment, includes at least processor 110 and at least memory 112. Memory 112 may include computer readable medium. The term computer readable medium, as used herein, refers to any medium that participates in providing instructions to processor 110 for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

In the preferred embodiment, client device 104 uses software that creates specialized interactive trading screens on client device's display terminal (the display terminal is not shown in the Figure for sake of simplicity). Trading screens enable traders to enter and execute orders, obtain market quotes, and monitor positions. The range and quality of features available to the trader on his or her screens varies according to the specific software application being run. The preferred embodiment may be implemented on any type of trading screen, therefore details regarding the trading screen are not necessary to understand the present invention.

For sake of illustration, however, a type of trading screen which can be used is provided by a commercially available trading application referred to as X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, and U.S. patent application Ser. No. 09/971,087, entitled "Click Based Trading With Intuitive Grid Display Of Market Depth And Price Consolidation," filed on Oct. 5, 2001, the contents of both are incorporated by reference herein. Another type of trading screen that can be used is one that displays dynamic prices and dynamic quantities associated with those prices, such a screen is described in U.S. patent application Ser. No. 09/589,751, entitled "Click Based Trading with Market Depth Display," filed on Jun. 9, 2000, the contents of which are incorporated by reference herein. Moreover, the trading application may implement tools for trading tradeable objects that are described in a U.S. patent application Ser. No. 10/125,894 filed on Apr. 19, 2002, entitled "Trading Tools for Electronic Trading," the contents of which are incorporated by reference. Again, it should be understood that the present invention is not be limited to any type of trading application or trading screen.

In the preferred embodiment, client device 104 receives market information 108 that was sent from host exchange 102. Then, when one or more user defined conditions are met in market information 108, transaction information 114 is automatically sent from client device 104 to host exchange 102. Preferably, transaction information 114 includes an order to buy or an order to sell a tradeable object. An order has two parameters, price and quantity, but of course, the present invention is not limited to a particular number of parameters that an order has. According to another embodiment, transaction information 114 might also refer to other order related transactions such as delete order messages, cancel and replace messages, and so forth. Details describing when transaction information is automatically sent to host exchange 102 are described below.

System Operation

Figure 2:
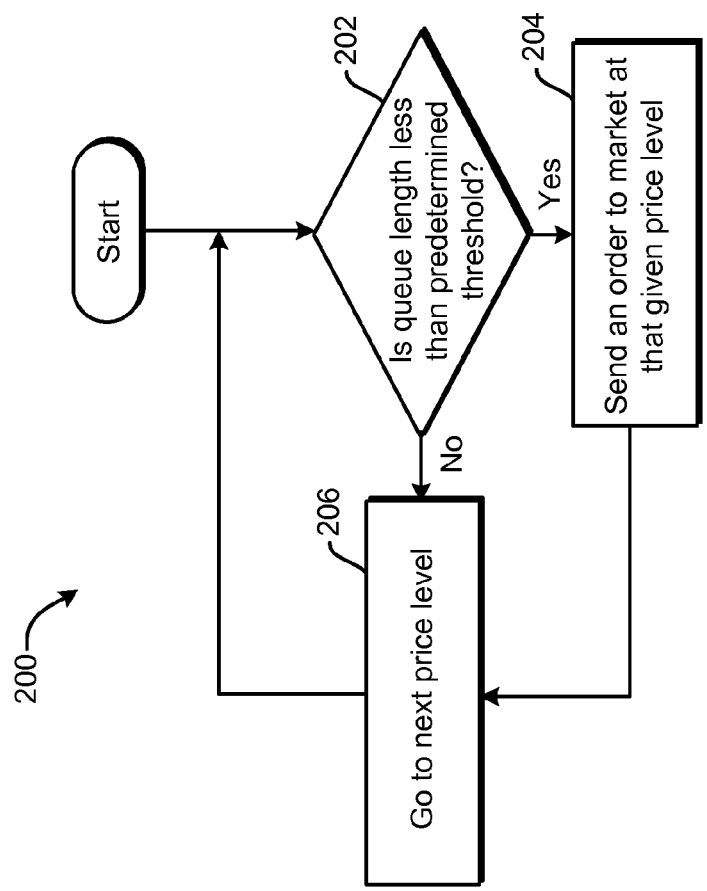
FIG. 2 is a flow diagram of an example process for automatically entering orders at price levels with queues falling below a predetermined threshold.

FIG. 2 is a flow diagram of a process 200 for automatically entering orders at price levels with queues falling below a predetermined threshold. Each step of the process 200 is described with respect to their respective sections below. It should be understood, however, that the process 200 provides only an illustrative description, and that more or fewer steps may be included in the flow diagram, and/or the steps may occur in one or more orders which are different from the order of steps shown in FIG. 2. For example, the client device could receive an update that includes the most recent quantity available at the price given in the update. Then, the system could perform steps 202 and 204 when an update occurs, and the need for step 206 would be eliminated. Modifications to the process 200, such as the in example given directly above, will be apparent to one skilled in the art.

Referring to the process 200 in FIG. 2, in step 202, a queue length at a given price level is compared to a predetermined threshold. According to one embodiment, the length of the queue (or queue length) represents quantity available at the given price level. The quantity available at one or more price levels is often provided by the host exchange in its data feed to the client devices. The number of price levels for which quantity is given is often exchange dependant.

In an alternative embodiment, the length of the queue represents a number of orders at a given price level. The number of orders that makes up the total quantity at a particular price level can also be relevant in assessing the length of the queue. This is useful because an opportunity might exist when the queue has little to no orders referred to as a short queue length. Whereas, a trader might stay away from price levels that have a large number of orders. For example, the total quantity at a certain price level is 500 but it is made up of only one order, a trader may consider that level to have a short queue if he or she believes the 500 order is a bluff that will be canceled shortly. That is, if that order gets cancelled, an order right behind it will become the first in line in the queue. The number of orders at a given price level can be provided by the host exchange, or alternatively, data feeds may be analyzed for estimating the queue length. Any available technique for estimating the queue length can be used. According to this embodiment, the threshold value is preferably a value that represents a particular number of orders.

In another alternative embodiment, the length of the queue represents an adjustable combination of the number of orders and quantity at the given price level. Then, the threshold value represents a unique combination of the maximum number of orders and the maximum quantity for which an order can be automatically sent. According to this alternative embodiment, the user can define a combination of conditions, which when met, an order (or some other transaction message) is sent to the host exchange. According to this embodiment, a threshold value might represent a particular ratio of a maximum quantity and orders.

Preferably, the boundary at which the queue length is compared to the threshold value can be adjusted accordingly. For example, the system can be programmed to send an order, per step 204 described below, when the quantity is less than, but not equal to the threshold value, but it can also be programmed to send the order, per step 204, when the quantity is equal to the threshold value. Other types of comparison operators may be used depending on how the queue length is measured and/or compared, and therefore the present invention is not limited to any particular comparison operator. Some example comparison operators include greater than, greater than or equal to, equal to, less than, or less than and equal to operators.

In step 204, an order is sent to market at the given price level when the threshold conditions are met, determined in step 202. Preferably, to enhance the system speed and reaction time, a trader can configure the trading application to automatically send orders, per step 204, for pre-set quantities (e.g., for 1 or greater). In a preferred embodiment, the trader can enter the pre-set quantity levels through an input device such as a keyboard, mouse, touch screen, electronic pen, and so forth which is electronically coupled to the client device at which he or she is trading. To illustrate, assume that a trader sets a pre-set quantity to 5. Then, when an order gets sent to the host exchange, it will be for a quantity of 5. It is envisioned that one order parameter (e.g., quantity) can be entered for both the buy side and the sell side (e.g., sell a quantity of 5 and/or buy a quantity of 5), but it is also envisioned that different order parameters can be entered separately for the buy side and the sell side (e.g., sell a quantity of 5 and/or buy a quantity of 7), depending on how the system is programmed.

In the preferred embodiment, a pre-set quantity is entered so that when one or more gaps, or equivalently, price levels with short queues which have met certain conditions, occurs in the market, an order for that pre-set quantity can automatically be sent to the exchange. As described above, there are several ways in which pre-set order parameters such as quantity may be input into the system. There are many other ways that can provide additional sophistication. For example, a trader could enter multiple pre-set quantities depending on how far away the gap is (or will be) away from the inside market. To illustrate, assume that the lowest ask price is 20 and the following example scenario. The trader could input the following pre-set quantities into the system: a quantity of 30 for gaps at price levels within 5 ticks from the inside market, a quantity of 25 for gaps at price levels between 6-10 ticks from the inside market, and a quantity of 20 for gaps at price levels between 11-15 ticks from the inside market. Then, if a gap occurred at a price of 24 (e.g., 4 ticks away from the lowest ask price), an order would be sent to sell 30 at the price of 24. However, if a gap occurred at a price of 28 (e.g., 8 ticks away from the lowest ask price), an order would be sent to sell 25 at the price of 28. In another example, pre-set quantities could be based on one or more particular equations. Then, a trader could link or type in one or more equations into the system to calculate pre-set quantities based on other factors (e.g., quantity sizes based on market conditions or a theoretical value). These examples and other similar types of ways to enter pre-set quantities preferably give the trader added flexibility to accommodate his or her particular trading strategy.

In step 206, the next price level is examined. Ideally, all of the price levels are examined at once, for example, through parallel processing or multiprocessing. If all price levels cannot be examined at once, then it is preferable to sequentially scan the price levels and perform the process described above. The system can preferably scan the data at price levels in any direction, depending on how the system is programmed. For example, it can be programmed to go to the next highest price level, or it can be programmed to go the next lowest price level. Alternatively, the system can be programmed to wait for the next price update to occur. Then, when an update occurs, the process can be performed on the updated information. This alternative embodiment would result in very quick reaction times by the system as upon receiving an update, it can react accordingly.

Preferably, the process of automatic entry can be turned "on" or "off" at the whim of the trader. This is sometimes useful because it gives the trader the ability to dynamically send in orders at one or more price levels which have short queues. So, for example, if the trader sees one or more opportunities and feels confident about sending orders into the exchange, he or she could simply turn on the automatic entry, and instantly (or near instantly) the system would preferably send in orders based in part on pre-set quantities to the electronic exchange for every price level that has a short queue within a designated range of price levels (described more below). It is envisioned that the "on" or "off" icons are easily accessible to the user as through graphical icons displayed on the screen, one or more hot keys programmed to turn "on" or "off" the system, or some other quick input means.

In some preferred instances, the automatic entry system can be in "manual mode," such that the system can be "on" yet it only highlights the gaps or opportunities to the trader, and only sends orders to the exchange when it is manually told to do so. That is, the automatic entry system preferably highlights or indicates to the user the gaps or opportunities in the market. The system can highlight or indicate gaps or opportunities graphically (e.g., using colors), flashing indicators, text, audio signals, etc. When the trader spots the right opportunity, preferably he or she can quickly indicate the intention through one or more input mechanisms to send orders into the exchange through the automatic entry system. In the preferred embodiment, the automatic entry system could have only one icon "Send Orders Now" such that when it is pressed, the automatic entry system immediately sends orders to an exchange at all gaps within a predetermined range (or ranges) of price levels. Preferably, the "Send Orders Now" icon is accessible to the trader such as through a graphical icon displayed on the screen, one or more hot keys programmed to send orders, or through another type of selection means. The predetermined range of price levels may be selected in a similar manner to using the upper bound and lower bound limits, described below. Other types of features may be programmed into the automatic entry system so that the trader can configure which gaps or opportunities he or she wishes to fill upon manually pressing or selecting an icon or button.

In another preferred embodiment, the automatic entry system could have more than one icon to manually enter orders. For instance, it is envisioned that an example "Send Buy Orders Now" icon and/or an example "Send Sell Orders Now" when pressed or selected allows the automatic entry system to immediately send orders at one or more gaps to the exchange. Using these two example icons, when the "Send Buy Orders Now" icon is pressed or selected if there are any gaps on the buy side within a pre-determined range (or ranges) of price levels, then the automatic entry system sends orders to fill those gaps. Likewise, when the "Send Sell Orders Now" icon is pressed or selected if there are any gaps on the sell side within a pre-determined range (or ranges) of price levels, then the automatic entry system sends orders to fill those gaps. According to the preferred embodiment, the predetermined range (or ranges) of price levels may be selected in a similar manner to using the upper bound and lower bound limits, described below. Like the other example icons described above, the "Send Buy Orders Now" and the "Send Sell Orders Now" icons are preferably accessible to the trader such as through graphical icons displayed on the screen, one or more hot keys programmed to send orders, or through another type of selection means. Also, it should be understood that more icons can be programmed that send orders to fill gaps at different price levels away from the inside market. For example, the system could be programmed such that one icon when pressed would send orders to fill any gaps up to 5 ticks away from the inside market, a second icon when pressed could send orders to fill any gaps between 6-10 ticks away from the inside market, and so forth.

To illustrate an embodiment where the length of the queue represents quantity, assume the following example fact scenario (summarized in the table below): a threshold value is set to 20, and at one point in time, a quantity of 100 is offered at a price of 95, a quantity of 115 is offered at a price of 96, a quantity of 5 is offered at a price of 97, and a quantity of 125 is offered at a price of 98.

| Price Level | Quantity |
|---|---|
| 98 | 125 |
| 97 | 5 |
| 96 | 115 |
| 95 | 100 |

Then, according to this embodiment, per step 204, an order is automatically sent to the host exchange at a price level 97, because the quantity available (e.g., 5) is less than the threshold value (e.g., 20). The order can be an order to buy or an order to sell and the order can have a quantity associated with the pre-set quantity. The type of order preferably depends on if the price levels under consideration have quantity on the buy side or on the sell side. One example way to determine this is to look at the inside market. If the price level under consideration is less than or equal to the best buy price, then the order submitted would be a buy order. Conversely, if the price level under consideration is greater than or equal to the best sell price, then the order submitted would be a sell order.

In the preferred embodiment, if the gap is located between the highest bid price and the lowest ask price, then the automatic entry system can utilize certain rules to determine whether an order should be sent, and if an order should be sent, what type of order it should be. For example, in one embodiment, no orders are sent at price levels between the highest bid price and the lowest ask price. For purposes of illustration, more example embodiments are described below.

In another embodiment, orders could be sent at price levels between the highest bid price and the lowest ask price, but the system could be programmed to enter only those orders that will not better the market by a pre-set tick amount. For example, assume that the trader wishes not to better the market by more than 2 ticks. Then, if the highest bid price is 10 and the lowest ask price is 15, the automatic entry system would enter orders to buy at 11 and 12 and orders to sell at 13 and 14.

In yet another embodiment, the order can be determined to be a buy order or a sell order based off a theoretical value (and not necessarily based on the inside market prices). Then, for example, the order would be a buy order for price levels below the theoretical and the order would be a sell order for price levels above the theoretical. Other limits or rules may be placed.

To illustrate the embodiment where the length of the queue represents a number of orders, assume the following example fact scenario (summarized in the table below): a threshold value is 2 orders, and at one point in time, a quantity of 100 is offered at a price of 95, a quantity of 115 is offered at a price of 96, a quantity of 5 is offered at a price of 97, and a quantity of 125 is offered at a price of 98. Also assume that the quantity of 100 at a price of 95 is actually made up of 3 orders to sell the tradeable object, the quantity of 115 at a price of 96 is made up of 4 orders, the quantity of 5 at a price of 97 is made up of 1 order, and the quantity of 125 at a price of 98 is made up of 10 orders.

| Price Level | Quantity | Number of Orders |
|---|---|---|
| 98 | 125 | 10 orders |
| 97 | 5 | 1 order |
| 96 | 115 | 4 orders |
| 95 | 100 | 3 orders |

Then, according to this embodiment, an order will be automatically sent to the host exchange at a price level of 97 because the number of orders (e.g., 1) is fewer than the threshold value (e.g., 2). Similar to the embodiment above which uses a threshold representing a quantity, the boundary at which an order is sent according to this embodiment can also be adjusted.

In the preferred embodiment, a user can preset a limit (e.g., upper bound limit) of the furthest number of ticks from the inside market (or any other price reference point, for that matter) for which the system will automatically send such orders. For example, if the inside market was at price levels bid 10 and ask 12 and the upper bound threshold was 5, then the system will send orders at prices that are no more than 5 ticks away from the inside market (e.g., 10−5=5 is the upper bound threshold for the buy side and 12+5=17 is the upper bound threshold for the sell side). Then, orders would not be sent at price levels 18, 19, 20, and higher on the sell side and orders would not be sent at price levels 4, 3, 2, and lower on the buy side. The example illustrated upper bound thresholds used on both the buy side and the sell side, however, it is also envisioned that the upper bound threshold can be used on only the buy side or only the sell side. FIG. 3 shows a price scale along with the inside market and upper limit values for this example. According to this example, acceptable price levels include those between 5 and 17.

Similarly, a user can preset a limit (e.g., lower bound limit) of the closest number of ticks to the inside market (or any other price reference point) for which the system will automatically send orders. For example, if the inside market was at price levels 10 and 12 and the lower bound threshold value was 2, then the system will send orders at prices that are no less than 2 ticks away from the inside market (e.g., 10−2=8 is the lower bound threshold for the buy side and 12+2=14 is the lower bound threshold for the sell side). Then, according to this example, orders would not be sent at price levels 12 and 13 on the sell side and orders would not be sent at price levels 10 and 9 on the buy side. The example illustrated lower bound thresholds used on both the buy side and the sell side, however, it is also envisioned that the lower bound threshold can be used on only the buy side or only the sell side. FIG. 4 shows a price scale along with the inside market and lower limit values for this example. According to this example, acceptable price levels include those at 14 and higher and those at 8 and lower.

Figure 5:
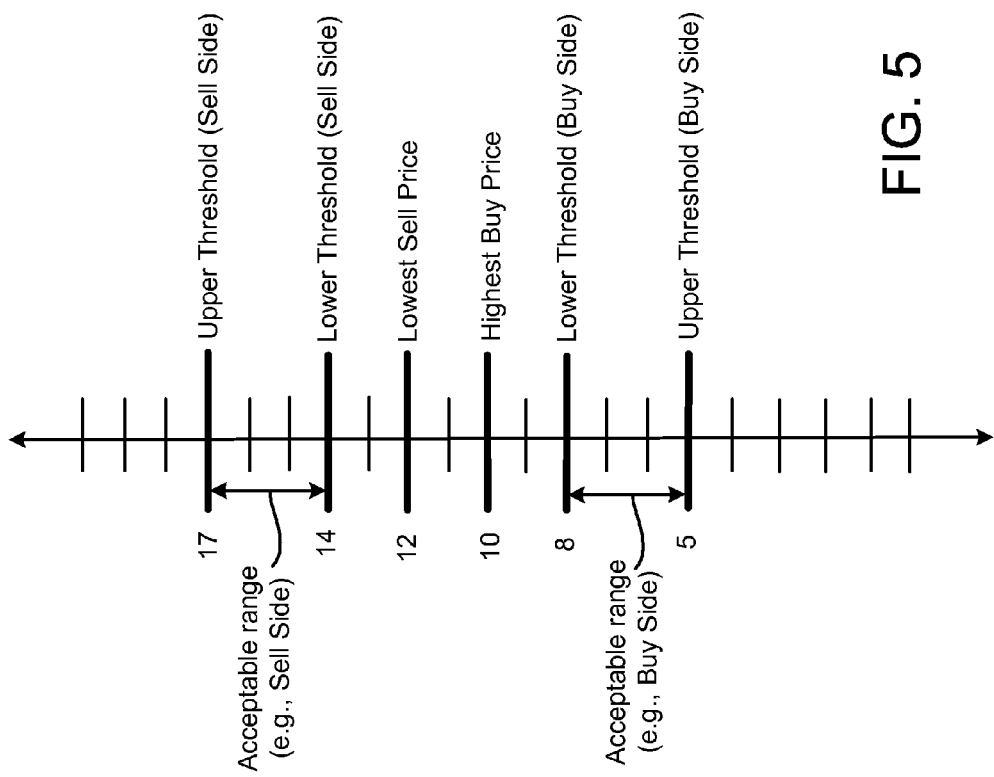

FIG. 5 shows a price scale along with the inside market, upper limit values, and lower limit values for the examples shown in FIGS. 3 and 4. According to this example shown with respect to FIG. 5 there are two range of price levels that are acceptable for the system to enter orders at if the queue length criterion or criteria is met. The acceptable ranges include price levels 5 to 8 (e.g., for the buy side) and price levels 14 to 17 (e.g., for the sell side). Also, it is possible to have more than one upper bound limit and/or to have more than one lower bound limit. For example, it may be possible to have more than one acceptable range of price levels on the buy side or have more than one acceptable range of price levels on the sell side.

As shown in the examples illustrated in FIG. 3-5, a user can set one limit that acts as an upper bound threshold for both the buy side and the sell side. The upper bound threshold in the examples above was 5 ticks for both the buy side and the sell side. Or a user can set one limit that acts as a lower bound threshold for both the buy side and the sell side. The lower bound threshold in the examples above was 2 ticks for both the buy side and the sell side. This is useful if the upper bound limits and/or the lower bound limits are the same for both the buy side and sell side. Alternatively, however, the user can have separate limits for the buy side and the sell side. Then, the user could preferably input at least 4 limits (e.g., an upper limit buy side, lower limit buy side, upper limit sell side, and lower limit sell side.)

Regardless of how many limits the trader is able to place, it is preferable that the trader can directly input the limits into their trading terminal or client device. Ways of inputting the limits might be through a keyboard, mouse device, touch screen, electronic pen, such that the limit value itself can be entered, or referring to FIGS. 3-5, the indicators representing the different thresholds could be dragged up or down along the price scale and the limit value is where the indicators land in relation to the price scale. It should be understood, however, that the present invention is not limited to the ways in which such limits are entered.

Figure 6:
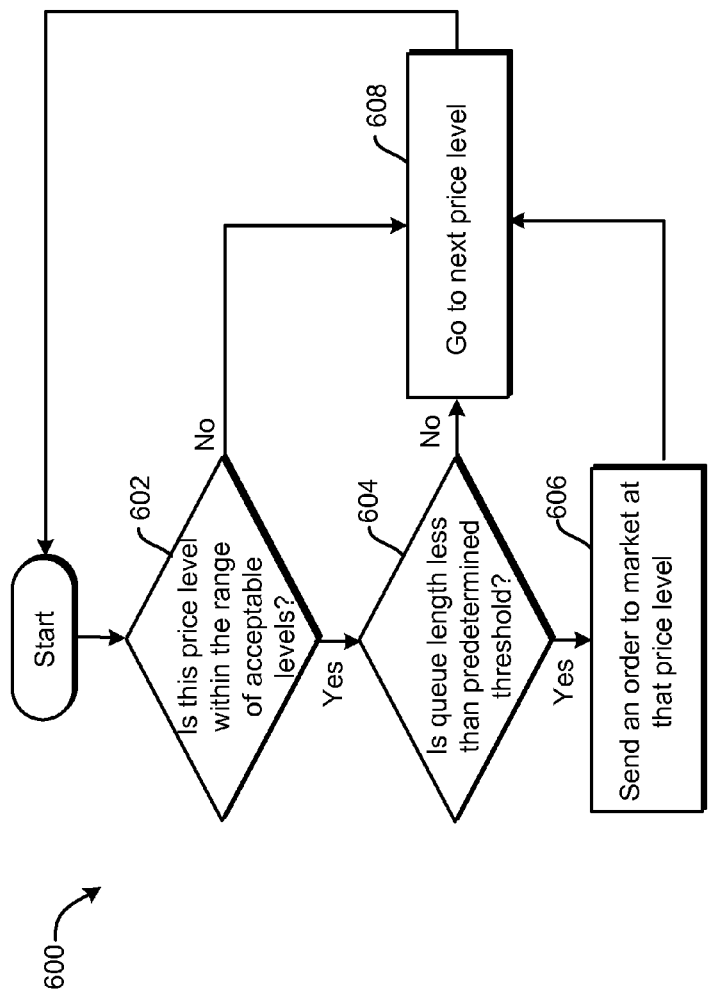
FIG. 6 is a flow diagram of an example process for automatically entering orders at price levels with queues falling below a predetermined threshold within a range of limits.

FIG. 6 is a flow diagram of a process 600 for automatically entering orders at price levels within a range of limits, which have queues falling below a predetermined threshold. FIG. 6 shows an example combination embodiment using an upper bound threshold and a lower bound threshold. It should be understood that the process 600 provides only an illustrative description, and that more or fewer steps may be included in the flow diagram, and/or the steps may occur in one or more orders which are different from the order of steps shown in FIG. 6. Modifications to the process 600, such as the example above, will be apparent to one skilled in the art.

In step 602, a determination is made as to whether the given price level is within the acceptable level(s) or limit(s). The limits in this example refer to a predetermined lower limit and a predetermined upper limit. As previously mentioned, though, the system can be programmed to implement only the lower limit or the upper limit on either the buy side or the sell side, independently of one another. To illustrate step 602, assume the following scenario. Price levels 10, 11, 13, and 15 each have quantity associated with them, where the price level 10 represents the lowest sell price. Also assume that a lower limit is chosen to be 2 ticks away from the inside market and an upper limit is chosen to be 4 ticks away from the inside market. Then, according to this example and this step, only price level that needs to be evaluated is price level 13 because the range of acceptable price levels falls between price levels 13 and 14.

In step 604, the queue length is compared to a threshold value. As mentioned before, the boundary at which queue length is compared to the threshold value can be adjusted accordingly depending on how the queue length is measured. In step 606, an order is sent to market when the threshold conditions are met. As described above, the order is preferably an order to buy a tradeable object or to sell a tradeable object. The quantity is preferably given by a pre-set quantity. For example, the condition in step 604 determines whether the queue length is less than the predetermined threshold. If this condition is true, then an order is sent to the market. If this condition is not true, then an order is not sent to the market.

In step 608, the next price level is examined. Ideally, all of the price levels are examined at once. If all price levels cannot be examined at once, then it is preferable to scan the price levels and perform the steps above. The system can scan the data at price levels in any direction, depending on how the system is programmed. For example, it can be programmed to go to the next highest price level, or it can be programmed to go the next lowest price level. Alternatively, the system can be programmed to wait for the next price update to occur. Then, when an update occurs, the process can be performed on the updated information. This alternative embodiment would result in very quick reaction times by the system as upon receiving an update, it can react accordingly, even before the trader is aware of the opportunity.

Transaction Information

In the preferred embodiment, orders are automatically sent to the electronic exchange when certain user defined conditions are met. However, the present invention is not limited to just sending orders, other types of transaction information, such as delete messages, may also be sent to the exchange based on a certain criterion or criteria. For example, a system could be programmed to delete orders that are placed at price levels which have long queue lengths. To illustrate, assume that the system was turned off and a trader entered an order at a particular price level. Unbeknownst to the trader, the entered order is last, or near last, in the queue at the exchange. If the trader later turned on the system, the system could determine that the previously entered order is too far behind in the queue according to the predetermined threshold and as a result the system would delete the order from the market. One skilled in the art would recognize other scenarios where the present invention may be helpful to the trader.

CONCLUSION

The preferred embodiments, or aspects of the preferred embodiment, provides the advantage of speed, which will be appreciated by those skilled in the art of trading. As mentioned above, short queue opportunities may exist for only brief moments of time. Using the teachings described herein, however, the system can more quickly recognize such an opportunity and automatically send an order, or other transaction message, to the electronic exchange in order to take advantage of it. This can occur much faster than a trader can do by manually viewing the opportunity and then humanly reacting to the opportunity by clicking a mouse or keyboard, for instance, to enter an order.

The foregoing description is presented to enable one of ordinary skill in the art to make and use the invention. Various modifications to the preferred embodiment will be readily apparent to those skilled in the art and the generic principles herein may applied to other embodiments. Therefore, it should be understood that the above description of the preferred embodiments, alternative embodiments, and specific examples are given by way of illustration and not limitation. Many changes and modifications, such as to the methods or system described herein, are within the scope of the present invention.

What is claimed is:

1. A method comprising:
    comparing, via an electronic processor, a length of a queue for a price level in a market to a threshold value; and
    submitting, via the electronic processor, an order message to an electronic exchange in response to the comparison of the length of the queue for the price level in the market to the threshold value, where the order message affects the length of the queue.

2. The method of claim 1 where the length of the queue represents a combination of at least a quantity currently available in the market to buy or sell a tradeable object at the price level and a number of orders currently available in the market for the tradeable object at the price level.

3. The method of claim 1 where the threshold value represents a combination of at least a quantity value and a number of orders value.

4. The method of claim 1 where the order message comprises instructions to delete a pending order.

5. The method of claim 1 where the threshold value comprises a ratio of quantity to orders.

6. The method of claim 3 further comprising adjusting, via the processor, the threshold value according to at least one of the particular quantity value, the particular number of orders value, and a combination thereof.

7. The method of claim 1 where the order message comprises instructions to place an order for a tradeable object.

8. A method comprising:
    comparing, via an electronic processor, a price level in a market to a predetermined level;
    comparing, via the electronic processor, a length of a queue for a price level in a market to a threshold value; and
    submitting, via the electronic processor, an order message to an electronic exchange in response to the comparison of the price level in the market to the predetermined level and the comparison of the length of the queue for the price level to the threshold, where the order message affects the length of the queue.

9. The method of claim 8 where the threshold represents at least any one of the following: a particular quantity value and a particular number of orders value.

10. The method of claim 8 further comprising determining, via the processor, the length of a queue for the price level, where the length of the queue represents at least any one of: a quantity of a tradeable object available in the market at the price level and a number of orders available in the market for the tradeable object at the price level.

11. The method of claim 8 where the predetermined level is based on the at least one order parameter.

12. The method of claim 8 where the predetermined level comprises an inside market for the tradeable object.

13. The method of claim 8 where the order message comprises instructions to place an order for a tradeable object in the market at a price based on the comparison of the price level to the predetermined level.

14. The method of claim 8 where the length of the queue is substantially equal to or less than the threshold value and the price level is substantially equal to or less than the predetermined level.

15. The method of claim 8 where the order message comprises instructions to delete a pending order for a tradeable object in the market.

16. The method of claim 15 where the length of the queue is substantially equal to or greater than the threshold value and the price level is substantially equal to or greater than the predetermined level.

17. The method of claim 15 where the pending order for the tradeable object in the market comprises a price determined based on the comparison of the price level to the predetermined level.

18. A method comprising:
   comparing, via an electronic processor, a length of a queue for pending orders at a price level in a market for a tradeable object to a threshold value; and
   identifying, via the processor, a price level for an order for the tradeable object in response to the comparison of the length of the queue for the price level in the market to the threshold value, where the threshold value represents at least any one of the following: a particular quantity value and a particular number of orders value.

19. The method of claim 18 where the length of the queue represents at least any one of the following: a quantity of a tradeable object available at the given price level in the market and a number of orders for the tradeable object available at the given price level in the market.

20. The method of claim 18 where identifying comprises displaying an indicator on a graphical user interface of the processor, where the indicator indicates the price level.

21. The method of claim 18 further comprising submitting an order message to an exchange to buy or sell the tradeable object at the price level in response to receiving a user command.

* * * * *